Patented Aug. 25, 1925.

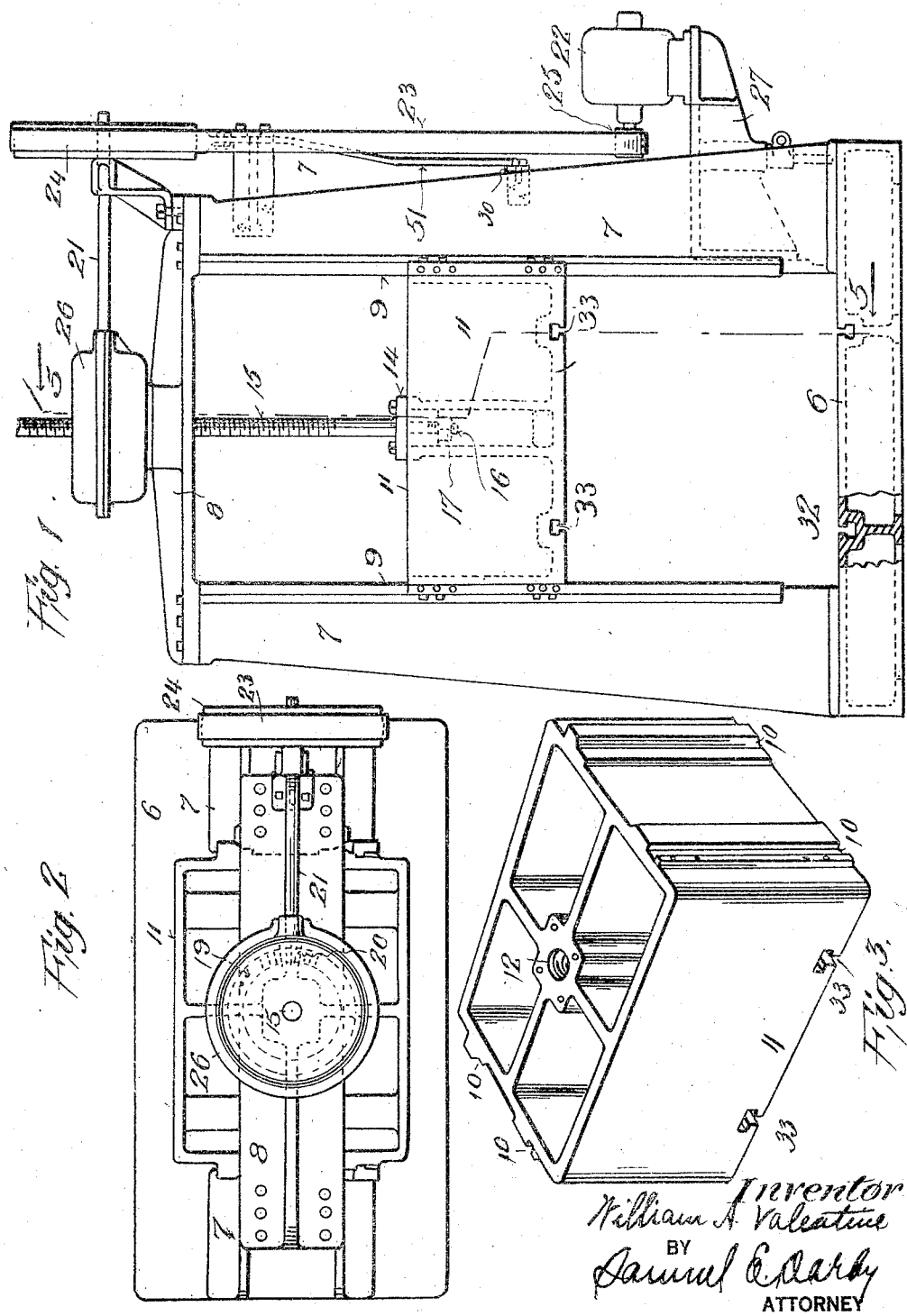

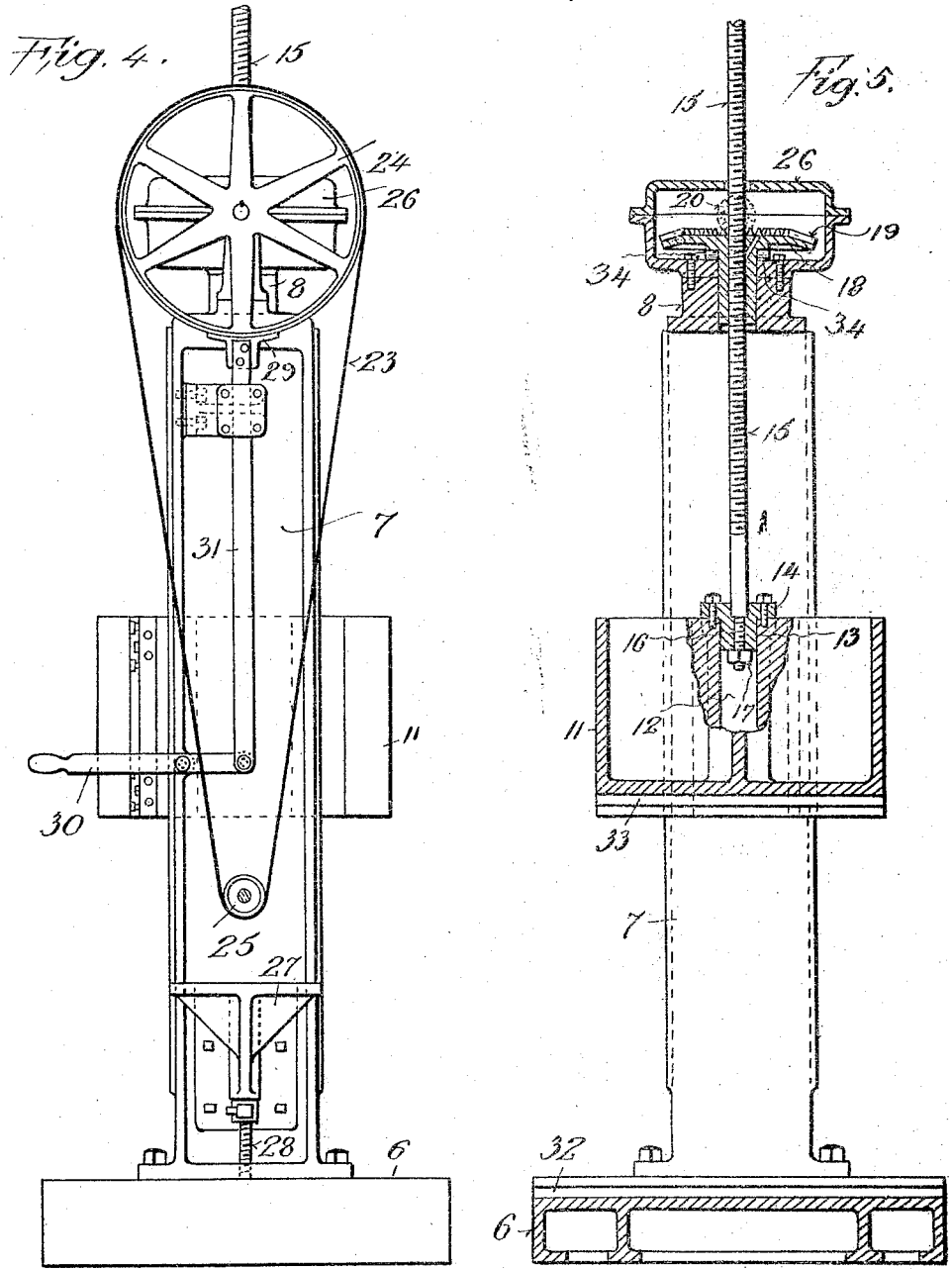

1,551,125

UNITED STATES PATENT OFFICE.

WILLIAM A. VALENTINE, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

DIE-FITTING MACHINE.

Application filed March 13, 1920. Serial No. 365,384.

*To all whom it may concern:*

Be it known that I, WILLIAM A. VALENTINE, a citizen of the United States, residing at Philadelphia, county of Philadelphia, State of Pennsylvania, have made a certain new and useful Invention in Die-Fitting Machines, of which the following is a specification.

This invention relates to die fitting machines and, particularly, to machines for use in accurately fitting together large heavy male and female dies.

The object of the invention is to provide a machine which is simple, strong and efficient in which large die members may be accurately fitted together in advance of their employment in the die press.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the drawings:—

Fig. 1 is a view in front elevation of a die fitting machine embodying the principles of my invention;

Fig. 2 is a top plan view of the same.

Fig. 3 is a detached detail view in perspective of a die member carrying block employed in the machine;

Fig. 4 is a view in side elevation of the machine; and

Fig. 5 is a vertical section on the line 5—5 of Fig. 1, looking in the direction of the arrows.

The same part is designated by the same reference numerals wherever it occurs in the several views.

In the manufacture of sheet steel stampings, and particularly stampings of large size, as well as for irregular shapes, it is the practice to employ male and female die members which are accurately fitted together to produce the required stamping. Experience has shown that the best results are secured by employing solid one-piece die members instead of die members made in sections, as thereby the trouble is avoided of causing or producing creases or lines in the surface of the stamping to be produced due to the seams and joints in the die surfaces. It has been attempted to fill up the joints and seams in the die surfaces where the sections of sectional dies come together, but this practice does not always remove the trouble and has been found in many cases to be unsatisfactory and to lead to additional expense in time and labor required to remove from the surfaces of stampings the ridges, lines or other markings produced therein by the joints or seams, or the fillings therefor in the die surfaces. For these and other reasons I have found it more economical and more satisfactory to make the dies in single pieces instead of in sections. This, however, requires the use of large heavy die members.

It is necessary to accurately fit together the male and female members of the dies before they are employed for production, and this necessity applies not only to single piece die members but also to die members made in sections.

Heretofore it has been the custom and practice to mount the male and female members of the die directly into the press for the purpose of accurately fitting the die surfaces thereof together and then to carry on the fitting operations while the dies are in the press. In carrying on the die fitting operations, the die faces are painted or coated over with suitable material and then brought together and any inaccuracies of fit will be revealed, upon separation of the dies, by the painted or coated surfaces. Then by filing, cutting or otherwise, the spots or areas of the die surfaces which do not accurately fit together are brought more nearly into accurate fit. The painting or coating and filing, cutting or other operations are then repeated over and over again and as often as may be required until finally the desired accurate fit and register of the die surfaces is secured. This operation is necessarily slow and tedious, and, of course, while it is being carried on in the die press itself, said press is removed from production operation, some times for many hours, and even days, in the case of large difficultly shaped dies, while the fitting operations are being carried on.

This is a serious objection in a large establishment where rapid quantity production is important. The die presses, particularly for heavy work are large and expensive machines, and while out of commission for production purposes, they represent loss during the time they remain idle and it is neither desirable, economical nor efficient practice for a plant to carry spare die presses. Moreover, in the case of large and heavy die members, the work of fitting the dies together is rendered exceedingly difficult and the time consumed therein is materially increased where the dies are fitted together while in the presses, because of lack of available space between the die faces for carrying on the fitting operations, even when the die members are separated to the utmost extent permitted by the press structure, because presses ordinarily are constructed to permit only a sufficient maximum separation of the die members to accommodate the insertion and removal of the work between and from the dies.

To overcome these practical objections, and they are, and I have found them to be, serious objections, I propose to provide a machine in which the die fitting operations may be carried on and accomplished before the dies are mounted in the die press. And in accordance with my present invention I provide for this purpose a simple inexpensive structure which permits sufficient separation of the die members to afford ample room and space between the die surfaces in which to effect the die fitting, filing and cutting operations.

By employing such a machine and effecting the die fitting operations therein before the dies are mounted in the presses, it is not necessary to interrupt the production operation of a press except merely to remove one set of dies therefrom and the substitution of a new set which have already been accurately fitted together. In other words the die fitting operations are accomplished outside of the press itself and the useful production work of the press has not been interrupted or suspended by the die fitting operations.

In the drawings I have shown a simple structure of die fitting machine which embodies in one form the principles of my invention, and wherein I employ a base 6 from which rises the side standards 7. These side standards 7 are connected together at their upper ends by a cross member 8. Upon their opposed vertical faces the side standards are provided with gibs or guides 9, which are received in guideways or channels 10 formed in or carried by the ends of a die member carrying block 11, mounted between to slide vertically up and down upon said standards. The block 11 is formed centrally of the upper surface thereof with a chamber or recess 12, in which is received the body of a flanged plug 13, the flange 14 of which is secured by means of bolts to the upper surface of the block. The lower end of a screw rod 15, is shouldered and threaded and the threaded portion 16 thereof is screwed centrally through the plug 13. A nut 17 serves to clamp together the plug and the shouldered end of the screw rod. The upper portion of the screw rod is threaded and works through the central threaded bore of the sleeve or hub of a nut 18. Attached to or forming part of the nut 18 is a bevel gear wheel 19, by which rotation is imparted thereto through a bevel pinion 20, carried by a shaft 21, which may be driven in any suitable manner from any convenient source of power, such, for example, as a motor 22, through a drive belt 23, operating over pulleys 24, 25.

If desired, and in order to reduce friction, the thrust of the nut gear may be taken on an anti-friction bearing 34.

The nut gear and its driving pin are housed within a casing 26 mounted centrally upon the cross frame member 8, which protects said gearing from dust and dirt and which also forms a chamber to contain lubricating material for the gearing and for the threaded engagement of the screw nut and screw rod.

The motor 22 is mounted upon a bracket 27, which is mounted upon the outer face of one of the standards 7, and is vertically adjustable in any convenient manner as, for example, by the adjusting screw 28.

If desired, a brake device may be employed in connection with the drive mechanism for the nut gear. A simple arrangement is shown wherein a brake shoe 29 is applied to pulley 24, and is operated by means of a lever 30, through rod 31.

The die members to be fitted together are respectively carried upon the base 6 and the block 11. Any convenient means may be employed to secure the die members in relative position for the fitting operations to be carried on. As shown, the upper face of the base is formed with T-shaped slots 32 adapted to receive headed clamp bolts by means of which one of the die members to be fitted is clamped to the base and held in place thereon. Likewise the lower face of the block 11 is formed with similar slots 33 for the purpose of receiving clamp bolts by which the other die member to be fitted may be clamped to said block.

The operation of the apparatus is exceedingly simple and requires no special comment. The die members to be fitted together are clamped respectively to the base and to the block 11, and by driving the gear nut 18 the screw rod 15 is raised or lowered, thereby raising or lowering the die member carrying block 11, as the work may require. After the fitting operations are completed, the die members are removed and placed in a die press ready at once for production operation.

It is to be understood that in the practical use and operation of a die fitting machine embodying the principles of my invention, it is undesirable for the die surfaces of the dies to be fitted together to be brought into contact with each other under conditions of power-applied pressure for the reason that under such conditions the danger is incurred of the die surfaces or one or the other of the die members being injured and therefore in accordance with my invention I avoid the use of a motor of large power, as well as the use of gear connections and lifting screw rods of the size and proportion required to accomplish press functions, the duty required of these parts being that of merely carrying the weight of the die supporting block 11 with the die member carried thereby. The use of the brake device, above referred to, contributes to this result, as the operation of lowering the die block 11 with a die member attached thereto may be arrested by an application of the brake device before power actuated pressure is exerted. In like manner the vertical adjustment of the bracket 27, on which the driving motor 22 is carried, also contributes to the same result in that thereby the binding tension of the drive belt 23 may be more or less controlled. Moreover, employing a single screw rod connected to the central portion of the die block 11 operates to avoid a power application of pressure of the upper die member upon the lower die member, inasmuch as such press arrangement in a large machine for securing power application of pressure with a small size screw rod would not be practical. It will also be seen that I provide a freely open framework having only the vertical standards 7 at opposite sides thereof, leaving the space entirely free and open within which the die fitters may work in performing their die fitting duties.

Having now set forth the objects and nature of my invention and a structure embodying the principles thereof what I claim as new and useful and of my own invention, and desire to secure by Letters Patent is:—

1. In a machine for fitting together the meeting faces of dies, a base having means to secure upon the upper face thereof one member of the die to be fitted, said base having a pair of widely spaced apart vertically extending standards of extended height, having gibs or guides extending lengthwise thereof on their inner opposed faces, a block having means to secure upon the lower face thereof the other die member to be fitted, said block having guideways or channels in the end surfaces thereof to receive said gibs or guides, motor means having connection with the center portion of said block, and means to operate said motor means, said base and said block being arranged relatively such that the block may be lowered to bring the opposed surfaces of the die members into superficial contact with each other and said standards being of extended height such that the block may be removed a substantial distance from the base to accommodate workmen between said opposed die faces.

2. In a machine for fitting together the meeting faces of dies, a base having means to secure upon the upper face thereof one of the die members to be fitted, said base having a pair of vertical standards spaced widely apart from each other and of extended height, said standards having gibs or guides extending lengthwise thereof on their inner opposed faces, a cross-member connecting the upper ends of said standards, a block having means to secure on the lower face thereof the other die member to be fitted, said block having vertical guideways or channels in the outer end surfaces thereof adapted to receive said gibs or guides, a motor means connected to said block, means to drive said motor means, whereby said block may be lowered to bring the opposed surfaces of the die members into superficial contact with each other and raised to a substantial height to permit workmen to enter the space between said opposed die surfaces, and a brake device to control said motor drive means.

In testimony whereof I have hereunto set my hand on this 9th day of March A. D., 1920.

WILLIAM A. VALENTINE.